Nov. 10, 1931.    I. A. WINTER ET AL    1,831,218
FLOW INDICATOR FOR HYDRAULIC TURBINES
Filed Nov. 7, 1927
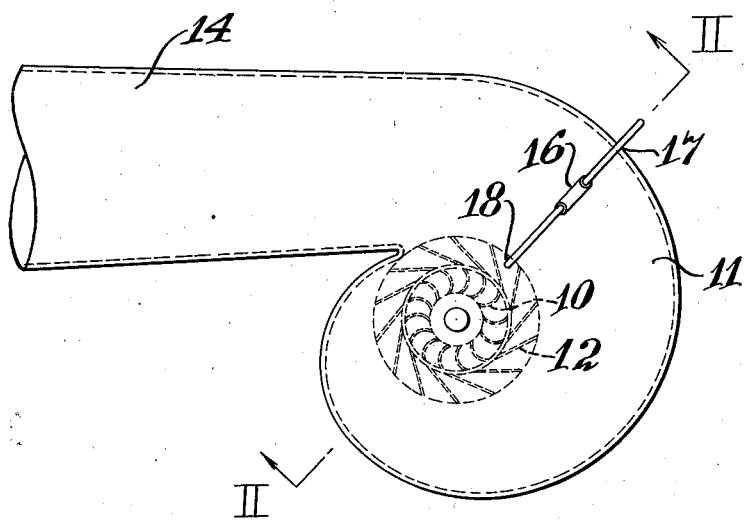
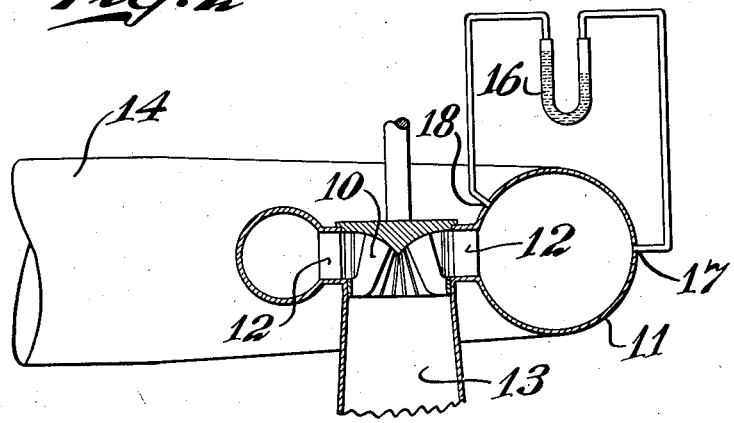
Inventors
I. A. Winter
A. A. Kennedy
By *Johnston*.   Attorney Patented Nov. 10, 1931

1,831,218

UNITED STATES PATENT OFFICE

IREAL A. WINTER, OF BIRMINGHAM, AND ABSALOM M. KENNEDY, OF TUSCALOOSA, ALABAMA

FLOW INDICATOR FOR HYDRAULIC TURBINES

Application filed November 7, 1927. Serial No. 231,457.

Our invention relates to apparatus for measuring or indicating the rate of flow of water through a hydraulic turbine, and has for its object the provision of simple, effective apparatus of the character designated which shall be economical of manufacture and reliable in operation.

Our invention is more particularly applicable to turbines of the reaction type having a scroll or volute casing for directing the water toward the guide vanes of the turbine, and its particular object is to provide a means for measuring or indicating the rate of flow of water through such a turbine, which shall operate by reason of the differential in hydrostatic pressure existing between selected points at different distances from the center of the turbine wheel within the scroll case, when the turbine is in operation.

Apparatus has heretofore been proposed to measure the flow of fluid through a conduit by interposing a right angled bend in the conduit and measuring the pressure differential across the bend. In such apparatus, the pressure differential on opposite sides of the right angle bend varies with the square of the velocity of the fluid flowing through the conduit. The use of such apparatus is objectionable with hydraulic turbines because the elbow bend interposed in the stream for turning the direction of the moving stream absorbs a high precentage of the available energy in the water and, furthermore, the eddy currents produced in turning the water stream sharply renders the readings erratic and inaccurate. Other means which have heretofore been proposed and widely used for measuring the flow of water through a turbine have comprised the well known Pitot tube and the Venturi tube. The Pitot tube is objectionable because of the danger of accumulation of trash in the tube receiving the impact of the water, and the difficulty of aligning this tube with the moving stream. The objections to the Venturi tube are the necessity of careful design of the structure which renders it expensive of manufacture, and the velocity change in the water flowing through the tube, which results in a loss in the power output of the turbine. Our invention operates in accordance with a different principle from that of any of the above mentioned devices, causes no velocity change in the flowing water, and is not open to the objections as to the expense of design and clogging in operation.

Briefly, our invention comprises a manometer, or other suitable pressure-differential indicating device, having its two sides communicating with an outer and an inner portion, respectively, of the scroll casing of a reaction type hydraulic turbine. As is well understood in the art to which our invention relates, water, in its approach to such a turbine, is gradually turned around the turbine wheel by the outer spiral casing, while the inner part of the stream of water is flowing radially inwards toward the center of the wheel and out through the draft tube. We have found that the pressure difference existing between points in the stream of water lying in the same radial plane, but at different distances from the center of the turbine wheel, varies as a function of the rate of flow of the water, following the law of constant moment of momentum. By measuring this pressure differential we are enabled, after proper calibration of the apparatus, to indicate or measure the exact flow through the turbine, at all times.

Apparatus embodying features of our invention is illustrated in the accompanying drawings, forming a part of this application, wherein Fig. 1 is a plan view of a hydraulic turbine embodying our invention, showing the turbine wheel and guide vanes in dotted lines; and Fig. 2 is a sectional view taken along the line II—II of Fig. 1.

Referring now to the drawings for a better understanding of our invention, we show a turbine wheel 10 of the reaction type mounted in a scroll or volute casing 11, the latter being provided with a plurality of guide vanes, or wicket gates, 12 for directing the water against the runners of the wheel 10. At 13 is shown the draft tube which discharges the water from the turbine to the tail race, not shown. Water is conveyed to the casing 11 through an intake tube 14.

We have found that, with turbines of the character described, the pressure differential in any radial plane, between the outer scroll case 11 and the guide vanes 12, varies as a function of the rate of flow to the turbine. We, accordingly, provide a manometer 16, which may be of any suitable type, and connect its two sides to inner and outer portions of the water stream through the scroll case 11, as at 17 and 18. It will be seen from the drawings, that the pressure at 17 is that determined by the momentum of the water in the intake 14, while the pressure at 18 is that due to the momentum of the water flowing towards the turbine wheel 10 or the inward radial flow toward the center of the turbine. While equally accurate results might be obtained by connecting the two sides of the manometer to other points around the scroll case, the greatest pressure difference is registered at the points shown; that is, in a radial plane at approximately 45° to the direction of flow of water through the intake 14.

Following is a set of readings made with our improved flow indicating device, employing a mercury column in the U tube of the manometer, and showing the actual water flow as calibrated by the Gibson method:

| Quantity of water flowing in cu. ft. per sec. | Manometer differential reading in inches of mercury |
|---|---|
| 890 | 0.5 |
| 1280 | 1.0 |
| 1845 | 2.0 |
| 2280 | 3.0 |
| 2650 | 4.0 |
| 2980 | 5.0 |
| 3290 | 6.0 |
| 3560 | 7.0 |
| 3820 | 8.0 |

From the foregoing, it will be apparent that we have devised an improved flow measuring device for hydraulic turbines which is simple of design and reliable in operation.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:

1. In a hydraulic turbine of the radial inflow axial discharge type having a spiral scroll case and a turbine wheel within the scroll case; a pressure connection to the scroll case adjacent the intake portion of the turbine, a second pressure connection to the scroll case at a point of lesser velocity motive fluid flow into the turbine and remote from the intake portion thereof, and pressure differential measuring means communicating with the two connections.

2. In a turbine of the radial inflow axial discharge type having a spiral scroll case, a turbine wheel within the case and guide vanes for directing motive fluid to the turbine wheel; a pressure connection to the scroll case located adjacent the guide vanes, a pressure connection to the case near the scroll case wall opposed to the guide vanes, and means for measuring the pressure differential between the two connections.

In testimony whereof we affix our signatures.

IREAL A. WINTER.
ABSALOM M. KENNEDY.